(12) United States Patent
Baba et al.

(10) Patent No.: US 9,523,991 B2
(45) Date of Patent: Dec. 20, 2016

(54) POWER SUPPLY SYSTEM

(71) Applicant: Panasonic Corporation, Kadoma-shi, Osaka (JP)

(72) Inventors: Akira Baba, Osaka (JP); Kiyotaka Takehara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 514 days.

(21) Appl. No.: 14/061,883

(22) Filed: Oct. 24, 2013

(65) Prior Publication Data

US 2014/0052310 A1 Feb. 20, 2014

Related U.S. Application Data

(63) Continuation of application No. PCT/JP2012/062607, filed on May 17, 2012.

(30) Foreign Application Priority Data

May 30, 2011 (JP) ................. 2011-120953

(51) Int. Cl.
*G05F 1/66* (2006.01)
*G06Q 50/06* (2012.01)
(Continued)

(52) U.S. Cl.
CPC ............... *G05F 1/66* (2013.01); *G06Q 50/06* (2013.01); *H02J 3/14* (2013.01); *H02J 3/383* (2013.01);
(Continued)

(58) Field of Classification Search
CPC ............... G05F 1/66; H02J 3/14; H02J 3/383; H02J 3/46; H02J 7/35; G06Q 50/06; Y04S 20/222; Y02B 70/3225; Y02E 10/566; Y02E 10/563
See application file for complete search history.

(56) References Cited

U.S. PATENT DOCUMENTS 7,197,378 B2 3/2007 Sato et al.
8,417,391 B1* 4/2013 Rombouts ............. G05B 13/02
700/286
(Continued)

FOREIGN PATENT DOCUMENTS

JP H10-248180 A 9/1998
JP H10-341530 A 12/1998
(Continued)

OTHER PUBLICATIONS

International Search Report for PCT/JP2012/062607 issued on Aug. 14, 2012.
(Continued)

*Primary Examiner* — Ramesh Patel
(74) *Attorney, Agent, or Firm* — Mots Law, PLLC (57) ABSTRACT

A controller executes local generation and local consumption pathways of: supplying power from a solar cell to an appliance, and charging a storage cell with power that remains after subtracting power consumed by the appliance from the solar cell power. In the absence of excess power, the storage cell and solar cell supply power. Power supply from a commercial electrical grid covers a power shortage that remains after subtracting solar cell power and storage cell power from the power consumed by the appliance. The controller also executes a second excess power selling mode pathway wherein excess power flows into the commercial electrical grid, and an assist mode wherein all solar cell power flows into the commercial electrical grid, and storage cell power flows to the appliance.

20 Claims, 8 Drawing Sheets

(51) Int. Cl.
*H02J 3/38* (2006.01)
*H02J 3/46* (2006.01)
*H02J 7/35* (2006.01)
*H02J 3/14* (2006.01)

(52) U.S. Cl.
CPC .. *H02J 3/46* (2013.01); *H02J 7/35* (2013.01); *Y02B 70/3225* (2013.01); *Y02E 10/563* (2013.01); *Y02E 10/566* (2013.01); *Y04S 20/222* (2013.01)

(56) References Cited

U.S. PATENT DOCUMENTS

| | | | | |
|---|---|---|---|---|
| 2003/0036820 A1* | 2/2003 | Yellepeddy | ............ | G05B 15/02 700/291 |
| 2003/0144864 A1* | 7/2003 | Mazzarella | .......... | G06Q 30/018 705/412 |
| 2004/0207264 A1* | 10/2004 | Sato | ........................ | G06Q 50/06 307/11 |
| 2005/0165511 A1* | 7/2005 | Fairlie | ........................ | F17D 1/04 700/286 |
| 2008/0167931 A1* | 7/2008 | Gerstemeier | .......... | G06Q 10/06 705/7.22 |
| 2008/0319893 A1* | 12/2008 | Mashinsky | ............ | G06Q 50/06 705/37 |
| 2010/0138066 A1* | 6/2010 | Kong | .................. | G06Q 30/018 700/295 |
| 2010/0204844 A1* | 8/2010 | Rettger | ..................... | H02J 3/06 700/291 |
| 2011/0276194 A1* | 11/2011 | Emalfarb | ............ | B60L 11/1838 700/297 |
| 2012/0078433 A1* | 3/2012 | Honma | ................. | F24D 11/004 700/295 |
| 2012/0150359 A1* | 6/2012 | Westergaard | ............. | H02J 3/14 700/291 |
| 2012/0274133 A1* | 11/2012 | Takehara | .................. | H02J 3/32 307/24 |
| 2012/0299383 A1 | 11/2012 | Cyuzawa et al. | | |

FOREIGN PATENT DOCUMENTS

| | | |
|---|---|---|
| JP | 2002-171674 A | 6/2002 |
| JP | 2004-88824 A | 3/2004 |
| JP | 2004-180467 A | 6/2004 |
| JP | 2004-274981 A | 9/2004 |
| JP | 2007-124811 A | 5/2007 |
| JP | 2007-330057 A | 12/2007 |
| JP | 2010-134980 A | 6/2010 |
| JP | 2011-15501 A | 1/2011 |
| JP | 2012-5168 A | 1/2012 |
| WO | 2010/143581 A1 | 12/2010 |

OTHER PUBLICATIONS

Extended European search report dated Oct. 22, 2014 issued for the corresponding European patent application No. 12792979.2.

* cited by examiner

POWER SUPPLY SYSTEM

CROSS REFERENCE TO RELATED APPLICATIONS

This application is a continuation application of International Application No. PCT/JP2012/062607, filed on May 17, 2012, entitled "POWER SUPPLY SYSTEM", which claims priority based on Article 8 of Patent Cooperation Treaty from prior Japanese Patent Application No. 2011-120953, filed on May 30, 2011, the entire contents of which are incorporated herein by reference.

BACKGROUND

The invention relates to a power supply system.

In Japan, photovoltaic power generators are spreading under the excess power purchasing system.

Moreover, there is a power supply system configured to supply appliances with power from a commercial power supply, photovoltaic power generation and a storage cell while combining power generated by the photovoltaic power generators with the commercial power supply, and also storing the power in the storage cell (for example, Japanese Patent Application Publication No. 2011-15501).

If power supply from a commercial electrical grid falls short of a power demand of the commercial electrical grid due to the unstable power supply from the commercial electrical grid, a power cut may occur in the commercial electrical grid.

In order to reduce an influence of a sudden power cut on consumers, an electric power company divides its power distribution area into local areas, prepares a power supply schedule for each local area in advance, and informs the consumers of the power supply schedule beforehand. Then, the electric power company combines a time slot for supplying power from the commercial electrical grid and a time slot for interrupting the power supply from the commercial electrical grid for each local area, so that the power supply capacity (power generation capacity) can satisfy the power demand in the power distribution area.

However, a power cut in a commercial electrical grid, if it occurs, has various influences on the consumers. For this reason, the electric power company desires to avoid a power cut as much as possible. On the other hand, the consumers desire to secure power by using photovoltaic power generation and a storage cell in the case of a power cut.

DISCLOSURE OF THE INVENTION

Against this background, an objective is to provide a power supply system capable of both improving a balance of electric power supply and demand in a commercial electrical grid, and enabling each consumer to secure electric power in the case of a power cut.

An aspect of the invention provides a power supply system that includes a commercial electrical grid, a distributed power source, a power storage cell, an appliance, and a controller configured to select a non-regular power transfer pathway among the power supply system components. The non-regular pathway comprises a first excess power selling mode of causing excess power generated by the distributed power source to reversely flow into the commercial electrical grid, and a second assist mode wherein all power generated by the distributed power source flows into the commercial electrical grid, and wherein the storage cell supplies power to the appliance.

The invention makes it possible to both improve a balance of electric power supply and demand in a commercial electrical grid, and enable each consumer to secure electric power in the case of a power cut.

In a preferred embodiment, the controller prohibits power from the storage cell from being supplied to the appliance before a power cut in the commercial electrical grid, charges the storage cell to a predetermined power storage amount by using the commercial power in a time slot in which an electric power rate of the commercial electrical grid is lower before the power cut in the commercial electrical grid, and during a power cut, directs distributed power source power to the appliance; charging the storage cell with power that remains after subtracting power consumed by the appliance from the power generated by the distributed power source; when there is no excess power, supplying the appliance with power stored in the storage cell together with the power generated by the distributed power source; and supplying the power from the commercial electrical grid to cover a power shortage that remains after subtracting the power generated by the distributed power source and the power supplied by the storage cell from the power consumed by the appliance.

In a preferred embodiment, the controller may select the non-regular pathway when the power supply capacity falls short of the power demand.

In a preferred embodiment, the controller may switch to the assist mode when the power supply capacity is estimated to fall short of the power demand within an execution period of the non-regular pathway In a preferred embodiment, the controller may receive data from an electric power company of power from the commercial electrical grid in advance, the data indicating whether the electric power company will purchase excess power, and selects the non-regular pathway when the data indicates that excess power will be purchased. Also in a preferred embodiment, the controller may receive data from the electric power company indicating when the assist mode will start within an execution period of the non-regular pathway.

In a preferred embodiment, the controller may automatically select to supply distributed power source power to the appliance; charge the storage cell with power that remains after subtracting power consumed by the appliance from the power generated by the distributed power source, and when there is no excess power, supply the appliance with power stored in the storage cell together with the power generated by the distributed power source; and supply available power from the commercial electrical grid to cover a power shortage that remains after subtracting the power generated by the distributed power source and the power supplied by the storage cell from the power consumed by the appliance, when communication with the power company is interrupted or when a power cut occurs in the commercial electrical grid.

Another aspect of the invention provides a power supply system that supplies power to an appliance from power generated by a distributed power source, power stored in a storage cell and supplied power from a commercial electrical grid. The system includes a controller configured to select between a first pathway and a second pathway. The first pathway includes supplying distributed power source power to the appliance; charging the storage cell with power that remains after subtracting power consumed by the appliance from the power generated by the distributed power source; when there is no excess power, supplying the appliance with power stored in the storage cell together with the power generated by the distributed power source; and supplying the power from the commercial electrical grid to cover a power shortage that remains after subtracting the power generated by the distributed power source and the power supplied by the storage cell from the power consumed by the appliance. The second pathway has a first excess power selling mode of causing the excess power to reversely flow into the commercial electrical grid, and a second assist mode wherein all power generated by the distributed power source flows into the commercial electrical grid, and wherein the storage cell supplies power to the appliance.

BRIEF DESCRIPTION OF THE DRAWINGS

More detailed preferred embodiments are described. Other features and advantages can be understood more deeply from the following detailed description and the accompanying drawings.

BEST MODES FOR CARRYING OUT THE INVENTION

Hereinafter, embodiments are described based on the drawings.

Embodiment 1

Figure 1:
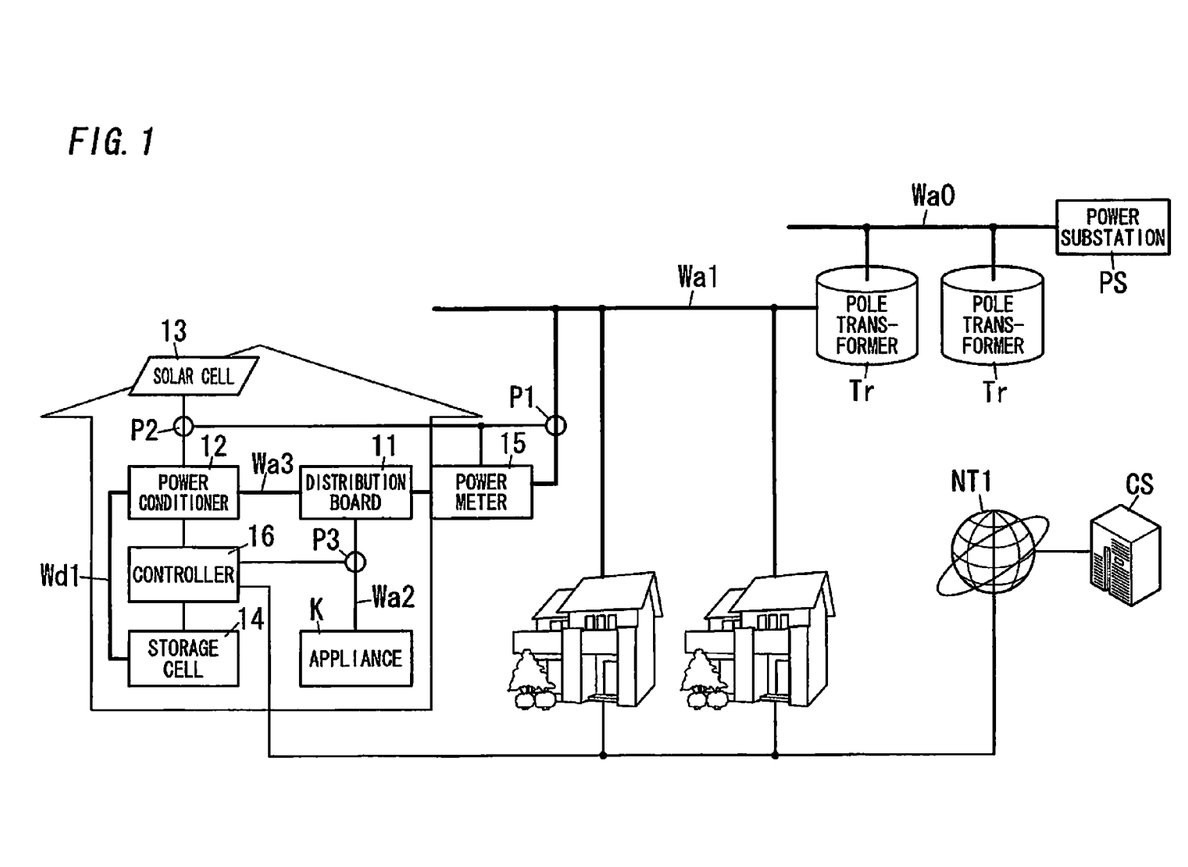
FIG. 1 is a block diagram illustrating a configuration of a power supply system of Embodiment 1.

A power supply system of this embodiment has a configuration illustrated in FIG. 1, and is used by each consumer supplied with power from an electric power company. This system includes distribution board 11, power conditioner 12, solar cell 13, storage cell 14, power meter 15, and controller 16 as main components.

Pole transformers Tr installed in the surroundings of consumers transform power at 6600 V transmitted via high voltage distribution line Wa0 from power substation PS of the electric power company into power at 200V/100V, and feeds the power at 200V/100V to main electric line Wa1 of a 200V/100V, 3-wire single phase distribution system. Main electric line Wa1 is drawn into each of consumers such as individual units of collective housing, single-family houses, factories, and offices, and is connected to distribution board 11. Main electric line Wa1 and high voltage distribution line Wa0 correspond to a commercial electrical grid.

Distribution board 11 houses a main power supply breaker, a branch breaker, a breaker for photovoltaic power generation, and the like, (not illustrated). Main electric line Wa1 branches into branch electric lines Wa2 via the main power supply breaker and the branch breaker. Each branch of electric lines Wa2 connects to appliance K such as a light, an air-conditioner, or other home appliance, and supplies AC power to the appliance. Here, FIG. 1 illustrates only one branch electric line Wa2.

Power conditioner 12 forms a photovoltaic power generator when combined with solar cell 13 and further forms a power storage device when combined with storage cell 14.

Firstly, DC power generated from solar light by solar cell 13 is supplied to power conditioner 12 and is converted into AC power by power conditioner 12. Power conditioner 12 has a function of grid-connected operation to cause the AC output to cooperate with commercial power supplied by power substation PS. Power conditioner 12 is connected to AC electric line Wa3, and then to main electric line Wa1 via distribution board 11. The AC output is transmitted via distribution board 11 and is supplied to branch electric lines Wa2 or reversely flows into the commercial electrical grid (electric power is sold).

In addition, storage cell 14 is formed of a secondary cell such as a lithium ion cell, which, for example, is connected to power conditioner 12 via charge-discharge electric line Wd1, and is controlled in charging and discharging by power conditioner 12. Specifically, power conditioner 12 charges storage cell 14 by using commercial power from the commercial electrical grid and power generated by solar cell 13. Moreover, power conditioner 12 converts power stored in storage cell 14 into AC power, and supplies the AC power to branch electric lines Wa2 from AC electric line Wa3 via distribution board 11.

Power meter 15 measures power traded between the commercial electrical grid and the consumer at grid monitor point P1 in main electric line Wa1, measures the power generated by solar cell 13 at power generation amount monitor point P2 in the output of solar cell 13, and transmits the measurement results to controller 16. In addition, the measurement results of power meter 15 are transmitted to management server CS in the electric power company via Internet NT1, and the electric power company uses the measurement results as meter-reading data of a power purchase amount and a power selling amount for each consumer. Here, the communications between power meter 15 and controller 16 may be any of wireless communications and wire communications.

Controller 16 measures load power to be supplied to appliances K from distribution board 11 at load monitor point P3 in branch electric line Wa2. Then, controller 16 causes power conditioner 12 to control charging and discharging of storage cell 14 based on the measurement result at load monitor point P3, the measurement results by power meter 15, the power storage amount of storage cell 14 and the like. Moreover, controller 16 of each consumer is communicatively connected to management server CS via Internet NT1.

Further, controller 16 of this system executes two pathways called "a local generation and local consumption algorithm" and "a peak assist algorithm" in a switchable manner in order to both improve a balance of electric power supply and demand in a commercial electrical grid, and enable each consumer to secure electric power in the case of a power cut. Note that the local generation and local consumption pathway corresponds to a first pathway, whereas the peak assist pathway corresponds to a second pathway.

To begin with, the electric power company judges whether a power generation capacity of a power plant (a power supply capacity of the commercial electrical grid) can satisfy a power demand on the next day on the basis of forecasts of the power generation capacity of the power plant and the power demand. Then, the electric power company sets a power selling scheme of the next day to "a non-purchase scheme" or "an excess power selling scheme" on the basis of the judgment result, and informs each consumer of the power selling scheme thus set.

More specifically, if the electric power company judges that the power generation capacity of the power plant can satisfy the power demand on the next day, management server CS informs controller 16 of each consumer that the power selling scheme of the next day is set to "the non-purchase scheme." The non-purchase scheme is a scheme where the electric power company does not purchase power generated by solar cell 13. In other words, management server CS of the electric power company transmits data, indicating whether or not to purchase excess power on the next day, to controller 16 of each consumer via Internet NT1 in advance.

Figure 2A:
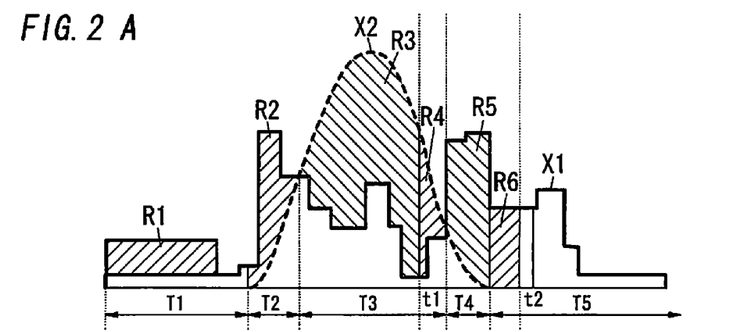
FIG. 2A is a pattern diagram illustrating a local generation and local consumption pathway of Embodiment 1.
Figure 2B:
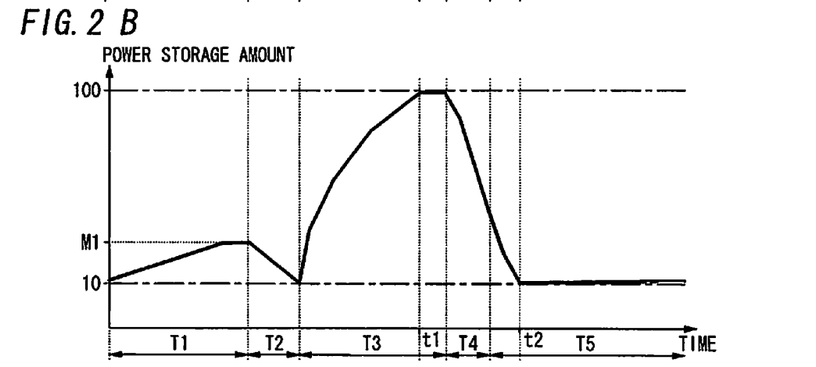
FIG. 2B is a pattern diagram illustrating the local generation and local consumption pathway of Embodiment 1.
Figure 2C:
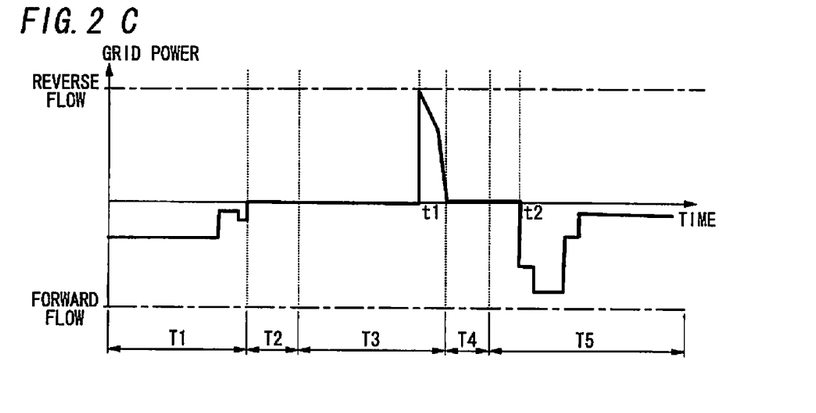
FIG. 2C is a pattern diagram illustrating the local generation and local consumption pathway of Embodiment 1.

If the power selling scheme of the next day is set to "the non-purchase scheme," controller 16 sets an operation of the next day to "the local generation and local consumption algorithm (first algorithm)" and causes power conditioner 12 to control charging and discharging of storage cell 14 according to the local generation and local consumption algorithm. FIGS. 2A to 2C illustrate operation patterns of a day under the execution of the local generation and local consumption algorithm. FIG. 2A illustrates a power pattern of a day, where X1 denotes a power consumption amount in a consumer, and X2 denotes a power generation amount of solar cell 13. FIG. 2B illustrates a power storage amount pattern of storage cell 14, and FIG. 2C illustrates a power pattern at grid monitor point P1. In addition, FIGS. 3A to 3D illustrate operation outlines within respective time slots in the local generation and local consumption algorithm.

Note that the non-purchase scheme is an ordinary power selling scheme and the local generation and local consumption algorithm is an algorithm executed at normal time.

Figure 3A:
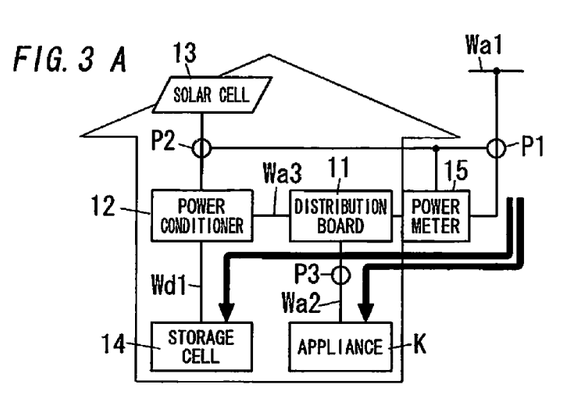
FIG. 3A is an outline diagram illustrating an operation in the local generation and local consumption pathway of Embodiment 1.

First, in night time T1 when the unit price of the commercial power (midnight power) supplied from power substation PS is low, a power storage operation in FIG. 3A is performed, and controller 16 instructs power conditioner 12 to charge storage cell 14 up to a target power storage amount M1 by using midnight power. Region R1 in FIG. 2A indicates this power storage amount by the midnight power. Meanwhile, appliances K operate by using the midnight power supplied from power substation PS. Thus, at grid monitor point P1 in night time T1, a forward power flow occurs for the power storage of storage cell 14 and the operations of appliances K.

Figure 3B:
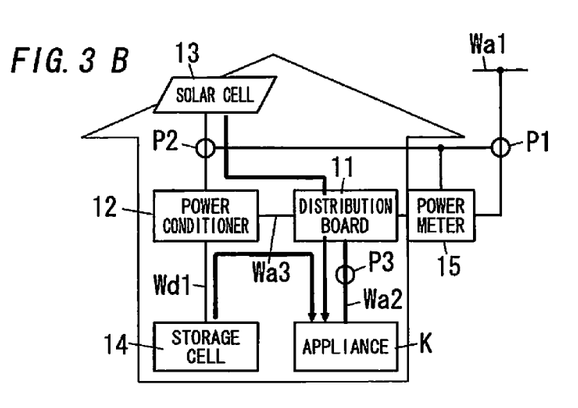
FIG. 3B is an outline diagram illustrating an operation in the local generation and local consumption pathway of Embodiment 1.
Figure 3C:
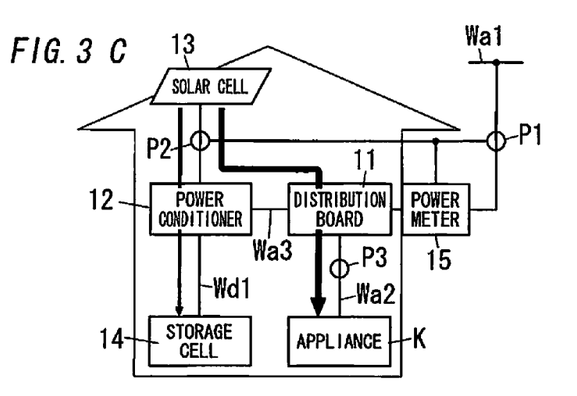
FIG. 3C is an outline diagram illustrating an operation in the local generation and local consumption pathway of Embodiment 1.

Next, in day time T2 to T4 when solar cell 13 generates power, a discharge operation in FIG. 3B or a power storage operation in FIG. 3C is performed.

Firstly, in time slot T2 (morning) when power generation amount X2 of solar cell 13 is smaller than power consumption amount X1 in the consumer, controller 16 instructs power conditioner 12 to perform the discharge operation in FIG. 3B in order to cover a power shortage by using the power stored in storage cell 14. Region R2 in FIG. 2A indicates this power shortage covered by the stored power. Thus, power conditioner 12 controls the discharging of storage cell 14 so that a forward power flow at grid monitor point P1 can be zero, converts the discharged power into the AC power and supplies the AC power to branch electric lines Wa2. In addition, power conditioner 12 also converts the power generated by solar cell 13 into the AC power and supplies the AC power to branch electric lines Wa2. In other words, appliances K operate by using the power generated by solar cell 13 and the power stored in storage cell 14.

Thereafter, in time slot T3 (daytime) when power generation amount X2 of solar cell 13 is larger than power consumption amount X1 in the consumer, controller 16 instructs power conditioner 12 to perform a charge operation in FIG. 3C in order to store the excess power from the photovoltaic power generation in storage cell 14. Region R3 in FIG. 2A indicates this power storage amount by the excess power. Thus, power conditioner 12 charges storage cell 14 by using the power generated by solar cell 13 so that a reverse power flow at grid monitor point P1 can be zero. In addition, power conditioner 12 also converts the power generated by solar cell 13 into the AC power and supplies the AC power to branch electric lines Wa2. In other words, appliances K operate by using the power generated by solar cell 13 only.

Then, when the power storage amount in storage cell 14 reaches 100% by storing the power generated by solar cell 13 (at time t1) in time slot T3, controller 16 instructs power conditioner 12 to stop the charge operation of storage cell 14. The excess power from the photovoltaic power generation not used for charging storage cell 14 any more is sold. At this time, a reverse power flow occurs for a power selling operation at grid monitor point P1. Region R4 in FIG. 2A indicates this power selling amount of the excess power.

After that, in time slot T4 (late afternoon) when power generation amount X2 of solar cell 13 is smaller than power consumption amount X1 in the consumer, controller 16 instructs power conditioner 12 to perform the discharge operation in FIG. 3B in order to cover a power shortage by using the power stored in storage cell 14. Region R5 in FIG. 2A indicates this power shortage covered by the stored power. Thus, power conditioner 12 controls the discharging of storage cell 14 so that a forward power flow at grid monitor point P1 can be zero, converts the discharged power into the AC power and supplies the AC power to branch electric lines Wa2. In addition, power conditioner 12 also converts the power generated by solar cell 13 into the AC power and supplies the AC power to branch electric lines Wa2. In other words, appliances K operate by using the power generated by solar cell 13 and the power stored in storage cell 14.

Subsequently, in night time T5, when the power generation amount X2 of solar cell 13 becomes zero, controller 16 instructs power conditioner 12 to perform the discharge operation in order to cover a power shortage by using the power stored in storage cell 14. Region R6 in FIG. 2A indicates this power shortage covered by the stored power. Thus, power conditioner 12 controls the discharging of storage cell 14 so that a forward power flow at grid monitor point P1 can be zero, converts the discharged power into the AC power and supplies the AC power to branch electric lines Wa2. In other words, appliances K operate by using the power stored in storage cell 14 only.

Figure 3D:
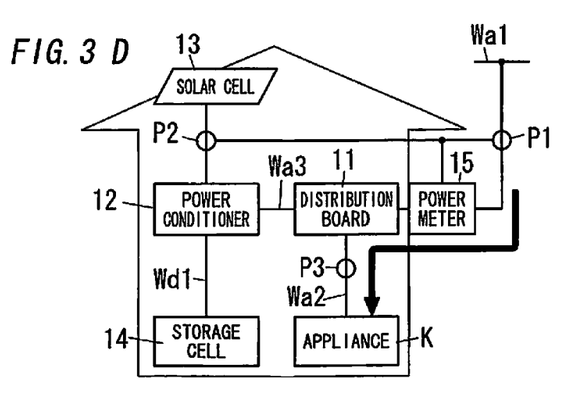
FIG. 3D is an outline diagram illustrating an operation in the local generation and local consumption pathway of Embodiment 1.

Then, when the power storage amount of storage cell 14 is reduced to 10% (at time t2), controller 16 instructs power conditioner 12 to stop the discharge operation of storage cell 14. After that, the commercial power from power substation PS is supplied to appliances K as illustrated in FIG. 3D. In other words, appliances K operate by only using the commercial power supplied from power substation PS, and a forward power flow occurs at grid monitor point P1.

Then, upon arrival of night time T1 when the unit price of the commercial power (midnight power) supplied from power substation PS is low after a lapse of time, the aforementioned power storage operation is again performed.

In this way, the local generation and local consumption algorithm takes control directed to storing a maximum possible amount of power generated by solar cell 13 in storage cell 14 and to consume the generated power and the stored power by the consumer. Thus, even when a sudden power cut occurs, each consumer can secure power supply during the power cut by using the power generated by solar cell 13 and the power stored in storage cell 14.

On the other hand, if the power generation capacity of the power plant is judged as falling short of the power demand on the next day, management server CS informs controller 16 of each consumer that the power selling scheme of the next day is set to "the excess power selling scheme." The excess power selling scheme is basically a scheme where each consumer sells a remaining portion (excess power) of power generated by solar cell 13 after use.

Figure 4:
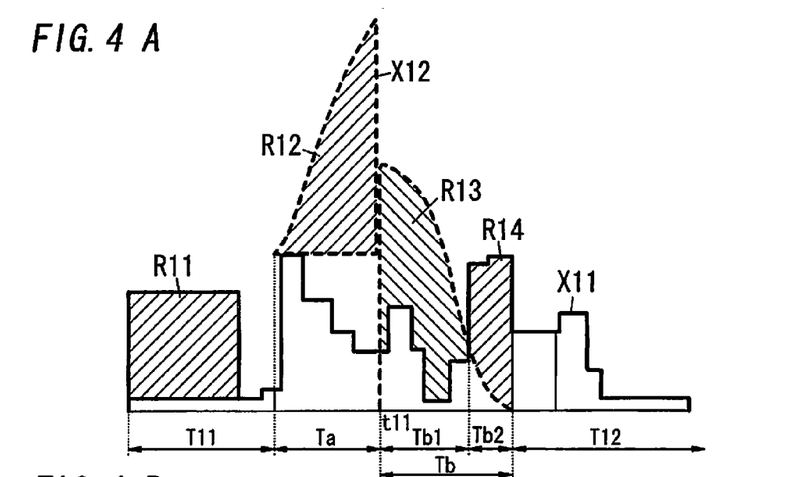
FIG. 4A is a pattern diagram illustrating a peak assist pathway of Embodiment 1.
FIG. 4B is a pattern diagram illustrating the peak assist pathway of Embodiment 1.
FIG. 4C is a pattern diagram illustrating the peak assist pathway of Embodiment 1.

If the power selling scheme of the next day is set to "the excess power selling scheme," controller 16 sets the operation of the next day to "the peak assist algorithm (second algorithm)" and causes power conditioner 12 to control the charging and discharging of storage cell 14 according to the peak assist algorithm. FIGS. 4A to 4C illustrate operation patterns of a day under the execution of the peak assist algorithm. FIG. 4A illustrates a power pattern of a day, where X11 denotes a power consumption amount in a consumer, and X12 denotes a power generation amount of solar cell 13. FIG. 4B illustrates a power storage amount pattern of storage cell 14, and FIG. 4C illustrates a power pattern at grid monitor point P1. In addition, FIGS. 5A to 5E illustrate operation outlines within respective time slots in the peak assist algorithm.

Figure 5A:
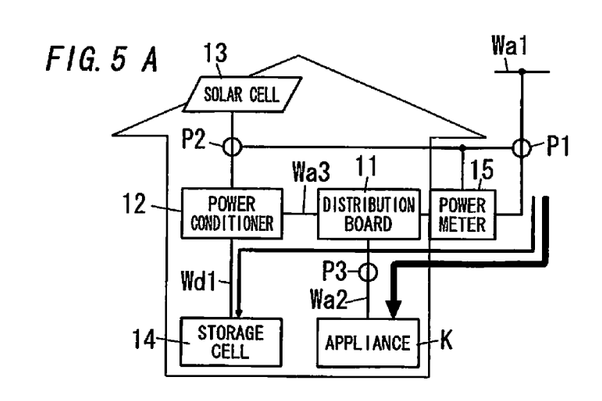
FIG. 5A is an outline diagram illustrating an operation in the peak assist pathway of Embodiment 1.

First, in night time T11 when the unit price of the commercial power (midnight power) supplied from power substation PS is low, a power storage operation in FIG. 5A is performed, and controller 16 instructs power conditioner 12 to charge storage cell 14 up to a target power storage amount 100% by using midnight power. Region R11 in FIG. 4A indicates this power storage amount by the midnight power. Meanwhile, appliances K operate by using the midnight power supplied from power substation PS. Thus, at grid monitor point P1 in night time T11, a forward power flow occurs for the power storage of storage cell 14 and the operations of appliances K.

Here, the "peak assist algorithm (second algorithm)" of this system has two operation modes called "excess power selling mode" and "peak assist mode." In this respect, at day time when solar cell 13 generates power, an operation is performed in "the excess power selling mode" or "the peak assist mode", while the excess power selling mode is set as a basic operation mode. When management server CS informs controller 16 that "the excess power selling scheme" is set, management server CS also informs controller 16 of timing for starting the peak assist mode. Within an execution period of the peak assist algorithm, a period set to the peak assist mode (peak assist mode period Ta) is set in a time slot in which the power generation capacity of the power plant is estimated to fall short of the power demand and each consumer is expected to assist a peak by selling all the amount of power. Here, peak assist mode period Ta is set to start at a timing when solar cell 13 starts power generation, as illustrated in FIG. 4A.

Figure 5B:
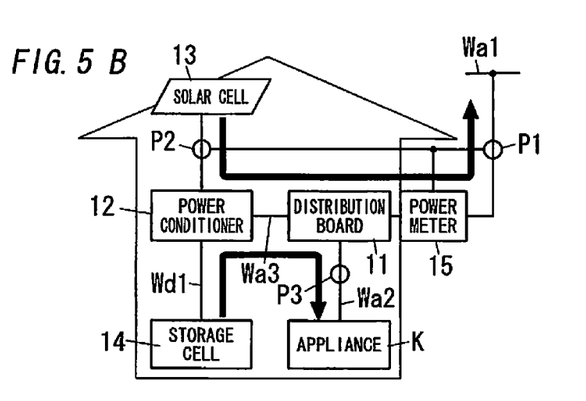
FIG. 5B is an outline diagram illustrating an operation in the peak assist pathway of Embodiment 1.

To begin with, in peak assist mode period Ta, controller 16 instructs power conditioner 12 to discharge power from storage cell 14 in an amount equal to that of load power at load monitor point P3, and a discharge operation in FIG. 5B is performed. In other words, appliances K operate by using the power stored in storage cell 14 only. Thus, in peak assist mode period Ta, all the power generated by solar cell 13 is sold. At this time, reverse power flow occurs for a power selling operation at grid monitor point P1. Region R12 in FIG. 4A indicates this power selling amount by the excess power.

In this way, in the peak assist algorithm, peak assist mode period Ta is set in the time slot in which the power generation capacity of the power plant is estimated to fall short of the power demand, whereby all the power generated by solar cells 13 of the respective consumers reversely flow into the commercial electrical grid. Accordingly, since a power supply amount from the commercial electrical grid increases, the balance of electric power supply and demand is improved with the power supply from the commercial electrical grid filling the power demand in the commercial electrical grid.

Instead, in peak assist mode period Ta, controller 16 may instruct power conditioner 12 to perform a discharge operation of storage cell 14 so that a reverse power flow at grid monitor point P1 can be equal to the power generated by solar cell 13 at power generation amount monitor point P2. In this case, the operation in FIG. 5B is also performed.

Then, when the power storage amount of storage cell 14 is reduced to 10% (at time t11), controller 16 instructs conditioner 12 to stop the discharge operation of storage cell 14, and shits to a period set to the excess power selling mode (excess power selling mode period Tb). Excess power selling mode period Tb includes excess power selling mode period Tb1 (daytime) in which power generation amount X12 of solar cell 13 is larger than power consumption amount X11 in the consumer, and excess power selling mode period Tb2 (late afternoon) in which power generation amount X12 of solar cell 13 is smaller than power consumption amount X11 in the consumer.

Figure 5C:
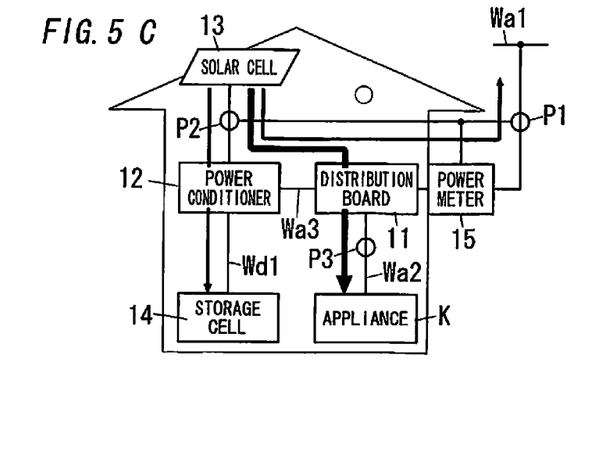
FIG. 5c is an outline diagram illustrating an operation in the peak assist pathway of Embodiment 1.

Firstly, in excess power selling mode period Tb1, controller 16 instructs power conditioner 12 to suspend the charge/discharge operation of storage cell 14. Since power generation amount X12 of solar cell 13 is larger than power consumption amount X11 in the consumer, appliances K operate by using the power generated by solar cell 13 only, and the excess power of the photovoltaic power generation not used by appliances K is sold as illustrated in FIG. 5C. At this time, reverse power flow occurs for the power selling operation at grid monitor point P1. Region R13 in FIG. 4A indicates this power selling amount by the excess power.

Figure 5D:
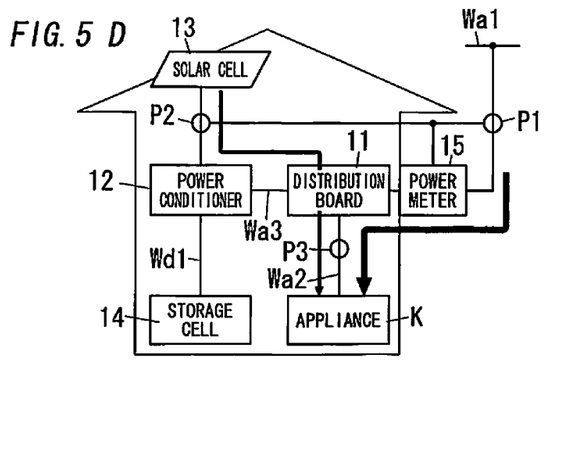
FIG. 5D is an outline diagram illustrating an operation in the peak assist pathway of Embodiment 1.
Figure 5E:
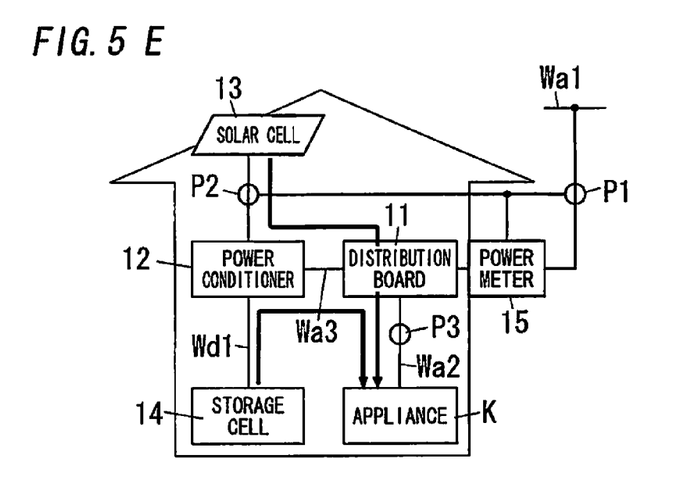
FIG. 5E is an outline diagram illustrating an operation in the peak assist pathway of Embodiment 1.

In excess power selling mode period Tb2, controller 16 also instructs power conditioner 12 to suspend the charge/discharge operation of storage cell 14. Since power generation amount X12 of solar cell 13 is smaller than power consumption amount X11 in the consumer, appliances K operate by using the power generated by solar cell 13 and the commercial power supplied from power substation PS as illustrated in FIG. 5D, and a forward power flow occurs at grid monitor point P1. Region R14 in FIG. 4A indicates this power shortage covered by the commercial power.

Thereafter, in night time T12, controller 16 also instructs power conditioner 12 to suspend the charge/discharge operation of storage cell 14. Since power generation amount X12 of solar cell 13 is zero, appliances K operate by using the commercial power supplied by power substation PS only, and a forward power flow occurs at grid monitor point P1.

Then, upon arrival of night time T11 when the unit price of the commercial power (midnight power) supplied from power substation PS is low after a lapse of time, the aforementioned power storage operation is again performed.

Here, peak assist mode period Ta is set to any time slot in which the power generation capacity of the power plant is estimated to fall short of the power demand within the execution period of the peak assist algorithm. Thus, peak assist mode period Ta does not always start at a timing in the morning as in the example of FIGS. 4A to 4C.

For instance, in the case where peak assist mode period Ta is set in the afternoon, the following operation is executed within excess power selling mode period Tb in the morning. In excess power selling mode period Tb in the morning, if power generation amount X12 of solar cell 13 is smaller than power consumption amount X11 in the consumer, controller 16 instructs power conditioner 12 to perform a discharge operation in FIG. 5E in order to cover a power shortage by using the power stored in storage cell 14. Thus, power conditioner 12 controls the discharge of storage cell 14 so that a forward power flow at grid monitor point P1 can be zero, converts the discharged power into the AC power and supplies the AC power to branch electric lines Wa2. In addition, power conditioner 12 also converts power generated by solar cell 13 into AC power and supplies the AC power to branch electric lines Wa2. In other words, appliances K operate by using the power generated by solar cell 13 and the power stored in storage cell 14.

In this way, this system uses the two algorithms, namely, "the local generation and local consumption algorithm" and "the peak assist algorithm" while switching them on the basis of the forecast information on the power generation capacity of the power plant and the power demand. Thus, this system is capable of both improving a balance of electric power supply and demand in a commercial electrical grid, and enabling each consumer to secure electric power in the case of a power cut. Here, in the embodiment, the forecast information on the power generation capacity of the power plant and the power demand is transmitted as data from management server CS of the electric power company via Internet NT1 as described above, and controller 16 executes the two algorithms while switching them on the basis of the data. However, this is not only the case, but such forecast information may be directly inputted by each consumer via a not-illustrated operational unit equipped in controller 16 in an offline state, for example.

In order for a consumer to prepare for a sudden power cut, for example, it is better to store excess power. To this end, at normal time, the local generation and local consumption algorithm is executed to take the control directed to storing a maximum possible amount of power generated by solar cell 13 in storage cell 14 and to consuming the generated power and the stored power in each consumer. Thus, even when a sudden power cut occurs, each consumer can secure power supply during the power cut by using the power generated by solar cell 13 and the power stored in storage cell 14. In the case where the power generation capacity of the power plant falls short of the power demand, however, it is better to execute the peak assist algorithm rather than the local generation and local consumption algorithm, thereby to sell a maximum possible amount of power generated by solar cell 13.

Embodiment 2

In Embodiment 1, the algorithms are switched at a time point when the power storage using midnight power starts at night time. The embodiment herein illustrates a case where the algorithms are switched at around noon.

Figure 6:
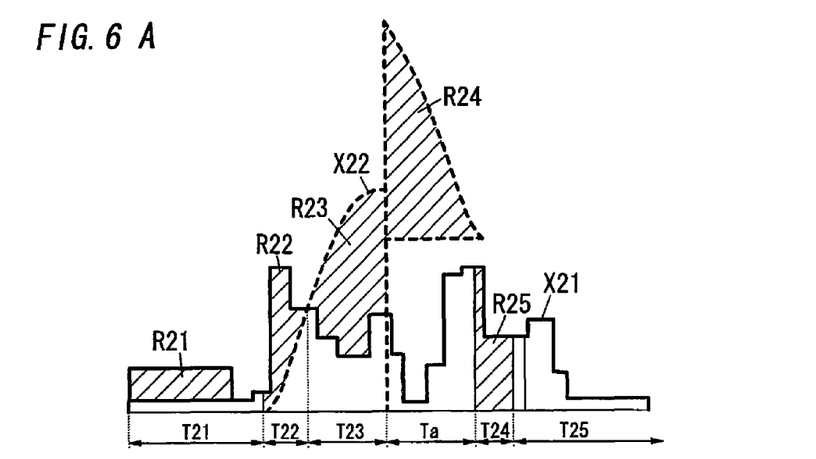
FIG. 6A is a pattern diagram illustrating an operation of Embodiment 2.
FIG. 6B is a pattern diagram illustrating the operation of Embodiment 2.
FIG. 6C is a pattern diagram illustrating the operation of Embodiment 2.

FIGS. 6A to 6C illustrate operation patterns of a day in a case where, at around noon, the power generation capacity of the power plant is judged as falling short of the power demand and the local generation and local consumption algorithm is switched to the peak assist algorithm. FIG. 6A illustrates a power pattern of a day, where X21 denotes a power consumption amount in a consumer, and X22 denotes a power generation amount of solar cell 13. FIG. 6B illustrates a power storage amount pattern of storage cell 14, and FIG. 6C illustrates a power pattern at grid monitor point P1.

To begin with, this system operates according to the local generation and local consumption algorithm. Thus, in night time T21 when the unit price of the commercial power (midnight power) supplied from power substation PS is low, the power storage operation in FIG. 3A is performed, and controller 16 instructs power conditioner 12 to charge storage cell 14 up to the target power storage amount M1 by using midnight power. Region R21 in FIG. 6A indicates this power storage amount by the midnight power. Meanwhile, appliances K operate by using the midnight power supplied from power substation PS. Thus, at grid monitor point P1 in night time T21, a forward power flow occurs for the power storage of storage cell 14 and the operations of appliances K.

Next, in a day time when solar cell 13 generates power, the discharge operation in FIG. 3B or the power storage operation in FIG. 3C is performed.

Firstly, in time slot T22 (morning) when power generation amount X22 of solar cell 13 is smaller than power consumption amount X21 in the consumer, controller 16 instructs power conditioner 12 to perform the discharge operation in FIG. 3B in order to cover a power shortage by using the power stored in storage cell 14. Region R22 in FIG. 6A indicates this power shortage covered by the stored power. Thus, power conditioner 12 controls the discharging of storage cell 14 so that a forward power flow at grid monitor point P1 can be zero, converts the discharged power into the AC power and supplies the AC power to branch electric lines Wa2. In addition, power conditioner 12 also converts the power generated by solar cell 13 into the AC power and supplies the AC power to branch electric lines Wa2. In other words, appliances K operate by using the power generated by solar cell 13 and the power stored in storage cell 14.

Thereafter, in time slot T23 (daytime) when power generation amount X22 of solar cell 13 is larger than power consumption amount X21 in the consumer, controller 16 instructs power conditioner 12 to perform the charge operation in FIG. 3C in order to store the excess power from the photovoltaic power generation in storage cell 14. Region R23 in FIG. 6A indicates this power storage amount by the excess power. Thus, power conditioner 12 charges storage cell 14 by using the power generated by solar cell 13 so that a reverse power flow at grid monitor point P1 can be zero. In addition, power conditioner 12 also converts the power generated by solar cell 13 into AC power and supplies the AC power to branch electric lines Wa2. In other words, appliances K operate by using the power generated by solar cell 13 only.

Then, at around noon, the power generation capacity of the power plant is judged as falling short of the power demand, and the local generation and local consumption algorithm is switched to the peak assist algorithm. Upon switching to the peak assist algorithm, the operation shifts to peak assist mode period Ta. In peak assist mode period Ta, controller 16 instructs power conditioner 12 to discharge power from storage cell 14 in an amount equal to that of load power at load monitor point P3, and the discharge operation in FIG. 5B is performed. In other words, appliances K operate by using the power stored in storage cell 14 only. Thus, in peak assist mode period Ta, all the amount of power generated by solar cell 13 is sold. At this time, a reverse power flow occurs for the power selling operation at grid monitor point P1. Region R24 in FIG. 6A indicates this power selling amount by the excess power.

Then, power generation amount X22 of solar cell 13 becomes zero. In the following time slot T24, controller 16 instructs power conditioner 12 to perform the discharge operation in order to cover a power shortage by using the power stored in storage cell 14. Region R25 in FIG. 6A indicates this power shortage covered by the stored power. Thus, power conditioner 12 controls the discharge of storage cell 14 so that forward power flow at grid monitor point P1 can be zero, converts the discharged power into the AC power and supplies AC power to branch electric lines Wa2. In other words, appliances K operate by using power stored in storage cell 14 only.

Then, when the power storage amount of storage cell 14 is reduced to 10%, controller 16 instructs power conditioner 12 to stop the discharge of storage cell 14. In the following time slot T25, the commercial power from power substation PS is supplied to appliances K as illustrated in FIG. 3D. In other words, appliances K operate by only using the commercial power supplied from power substation PS, and a forward power flow occurs at grid monitor point P1.

Figure 7A:
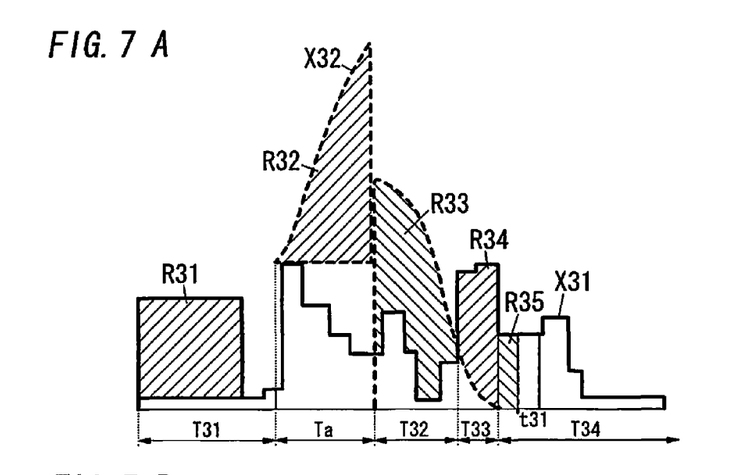
FIG. 7A is a pattern diagram illustrating another operation of Embodiment 2.
Figure 7B:
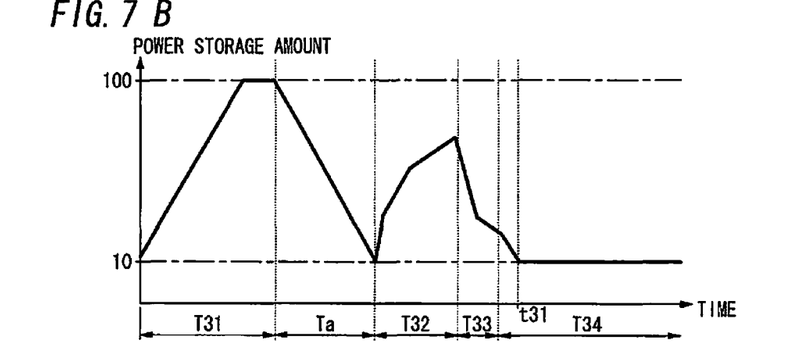
FIG. 7B is a pattern diagram illustrating the other operation of Embodiment 2.
Figure 7C:
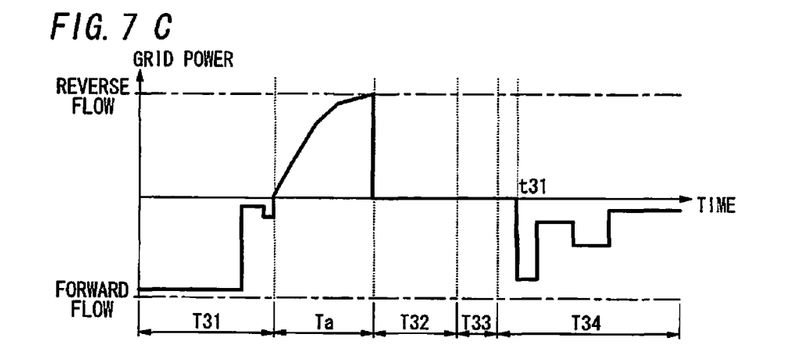
FIG. 7C is a pattern diagram illustrating the other operation of Embodiment 2.

Next, FIGS. 7A to 7C illustrate operation patterns of a day in a case where, at around noon, the power generation capacity of the power plant is judged as causing an oversupply relative to the power demand and the peak assist algorithm is switched to the local generation and local consumption algorithm. FIG. 7A illustrates a power pattern of a day, where X31 denotes power consumption by a consumer, and X32 denotes power generation of solar cell 13. FIG. 7B illustrates a power storage pattern of storage cell 14, and FIG. 7C illustrates a power pattern at grid monitor point P1.

To begin with, this system operates according to the peak assist algorithm. Thus, in night time T31 when the unit price of the commercial power (midnight power) supplied from power substation PS is low, the power storage operation in FIG. 5A is performed, and controller 16 instructs power conditioner 12 to charge storage cell 14 to the target power storage amount 100% by midnight power. Region R31 in FIG. 7A indicates this power storage by midnight power. Meanwhile, appliances K operate by using midnight power supplied from power substation PS. Thus, at grid monitor point P1 in night time T31, a forward power flow occurs for power storage of storage cell 14 and the operations of appliances K.

Next, peak assist mode period Ta starts when solar cell 13 starts power generation. In peak assist mode period Ta, controller 16 instructs power conditioner 12 to discharge power from storage cell 14 in an amount equal to that of load power at load monitor point P3, and the discharge operation in FIG. 5B is performed. In other words, appliances K operate by using the power stored in storage cell 14 only. Thus, in peak assist mode period Ta, all power generated by solar cell 13 is sold. At this time, a reverse power flow occurs for the power selling operation at grid monitor point P1. Region R32 in FIG. 7A indicates this power selling amount by the excess power.

Thereafter, at around noon, the power generation capacity of the power plant is judged as causing an oversupply relative to the power demand, and the peak assist algorithm is switched to the local generation and local consumption algorithm. In time slot T32 immediately after the switch to the local generation and local consumption algorithm, power generation amount X32 of solar cell 13 is larger than power consumption amount X31 in the consumer. For this reason, controller 16 instructs power conditioner 12 to perform the charge operation in FIG. 3C to store the excess power from the photovoltaic power generation in storage cell 14. Region R33 in FIG. 7A indicates this power storage amount by the excess power. Thus, power conditioner 12 charges storage cell 14 by using the power generated by solar cell 13 so that a reverse power flow at grid monitor point P1 can be zero. In addition, power conditioner 12 also converts the power generated by solar cell 13 into the AC power and supplies the AC power to branch electric lines Wa2. In other words, appliances K operate by using power generated by solar cell 13 only.

Then, in time slot T33 (late afternoon) when power generation amount X32 of solar cell 13 is smaller than power consumption amount X31 in the consumer, controller 16 instructs power conditioner 12 to perform the discharge operation in FIG. 3B to cover a power shortage by using the power stored in storage cell 14. Region R34 in FIG. 7A indicates this power shortage covered by the stored power. Thus, power conditioner 12 controls the discharge of storage cell 14 so that a forward power flow at grid monitor point P1 can be zero, converts the discharged power into AC power and supplies the AC power to branch electric lines Wa2. In addition, power conditioner 12 also converts power generated by solar cell 13 into AC power and supplies the AC power to branch electric lines Wa2. In other words, appliances K operate by using power generated by solar cell 13 and power stored in storage cell 14.

Thereafter, in night time T34, when power generation amount X32 of solar cell 13 becomes zero, controller 16 instructs power conditioner 12 to perform the discharge operation to cover a power shortage by using power stored in storage cell 14. Region R35 in FIG. 7A indicates this power shortage covered by the stored power. Thus, power conditioner 12 controls the discharge of storage cell 14 so that a forward power flow at grid monitor point P1 can be zero, converts the discharged power into AC power and supplies the AC power to branch electric lines Wa2. In other words, appliances K operate by using the power stored in storage cell 14 only.

Then, when the power storage amount of storage cell 14 is reduced to 10% (at time t31), controller 16 instructs power conditioner 12 to stop the discharge operation of storage cell 14. After that, the commercial power from power substation PS is supplied to appliances K as illustrated in FIG. 3D. In other words, appliances K operate by only using the commercial power supplied from power substation PS, and a forward power flow occurs at grid monitor point P1.

In the embodiment described herein, the system also uses the two algorithms, namely, "the local generation and local consumption algorithm" and "the peak assist algorithm" while switching them on the basis of the forecast information on the power generation capacity of the power plant and the power demand. Thus, this system is capable of both improving a balance of electric power supply and demand in a commercial electrical grid, and enabling each consumer to secure electric power in the case of a power cut.

Moreover, in the foregoing embodiments, in the case of charging storage cell 14 by using midnight power, the target power storage amount is determined based on an integral value of power consumption by appliances K that operate using the stored power. Historical logs of actual power consumption of appliances K may be stored, and this target power storage amount may be determined based on the historical logs.

In addition, when a power cut in the commercial electrical grid is judged as unavoidable because the power generation capacity of the power plant is expected to fall short of the power demand, management server CS informs controller 16 of each consumer of a power cut time slot. Controller 16 informed of the power cut time slot prohibits the discharging control before the power cut time slot, charges storage cell 14 up to the power storage amount 100% (full charge) by using midnight power before the power cut time slot arrives, and executes the local generation and local consumption algorithm during the power cut. In this way, each consumer can more certainly secure power during a power cut.

Further, controller 16 automatically executes the local generation and local consumption algorithm when the communication with management server CS is interrupted or when a power cut occurs in the commercial electrical grid.

Moreover, controller 16 may automatically execute peak assist mode period Ta of the peak assist algorithm for a predetermined time (for example, 11 o'clock to 16 o'clock) within a predetermined term (for example in summer).

Additionally, when a voltage drop occurs in the commercial electrical grid, controller 16 may judge that the supply capacity of the commercial power is insufficient, and automatically execute the peak assist algorithm.

Note that the foregoing embodiments use solar cell 13 as a distributed power source, but may use any other distributed power source such as a fuel cell or a wind power generator.

Although the several preferred embodiments are described above, the invention can be variously altered and modified by those skilled in the art without departing from the original spirit and scope of the invention, i.e., the scope of claims.

The invention claimed is:

1. A power supply system comprising a commercial electrical grid, a distributed power source, a storage cell, an appliance, and a controller configured to select a non-regular power transfer pathway among the power supply system components; wherein the distributed power source, the storage cell, the appliance and the controller are located on a consumer unit side of the power supply system;

the non-regular pathway comprises a first excess power selling mode of causing excess power generated by the distributed power source to reversely flow into the commercial electrical grid, and a second assist mode wherein all power generated by the distributed power source flows into the commercial electrical grid, and the storage cell supplies all power to the appliance in the second assist mode.

2. The power supply system according to claim 1, wherein the controller prohibits power from the storage cell from being supplied to the appliance before a power cut in the commercial electrical grid, charges the storage cell to a predetermined power storage amount by using the commercial power in a time slot in which an electric power rate of the commercial electrical grid is lower before the power cut in the commercial electrical grid, and during a power cut, directs distributed power source power to the appliance; charging the storage cell with power that remains after subtracting power consumed by the appliance from the power generated by the distributed power source; when there is no excess power, supplying the appliance with power stored in the storage cell together with the power generated by the distributed power source; and supplying the power from the commercial electrical grid to cover a power shortage that remains after subtracting the power generated by the distributed power source and the power supplied by the storage cell from the power consumed by the appliance.

3. The power supply system according to claim 2, wherein the controller selects the non-regular pathway when the power supply capacity falls short of the power demand.

4. The power supply system according to claim 3, wherein the controller switches to the second assist mode when the power supply capacity is estimated to fall short of the power demand within an execution period of the non-regular pathway.

5. The power supply system according to claim 1, wherein the controller selects the non-regular pathway when the power supply capacity falls short of the power demand.

6. The power supply system according to claim 5, wherein the controller switches to the second assist mode when the power supply capacity is estimated to fall short of the power demand within an execution period of the non-regular pathway.

7. The power supply system according to claim 1, wherein the controller receives data from an electric power company of power from the commercial electrical grid in advance, the data indicating whether the electric power company will purchase excess power, and selects the non-regular pathway when the data indicates that excess power will be purchased.

8. The power supply system according to claim 7, wherein the controller receives data from the electric power company indicating when the second assist mode will start within an execution period of the non-regular pathway.

9. The power supply system according to claim 7, wherein the controller automatically selects to supply distributed power source power to the appliance; charge the storage cell with power that remains after subtracting power consumed by the appliance from the power generated by the distributed power source; and when there is no excess power, supply the appliance with power stored in the storage cell together with the power generated by the distributed power source; and supply available power from the commercial electrical grid to cover a power shortage that remains after subtracting the power generated by the distributed power source and the power supplied by the storage cell from the power consumed by the appliance;

when communication with the power company is interrupted or when a power cut occurs in the commercial electrical grid.

10. The power supply system according to claim 7, wherein the data is received from a management server of the electric power company.

11. A power supply system that supplies power to an appliance from power generated by a distributed power source, power stored in a storage cell and supplied power from a commercial electrical grid, the power supply system comprising:

a controller configured to select between a first pathway and a second pathway, wherein the distributed power source, the storage cell, the appliance and the controller are located on a consumer unit side of the power supply system;

the controller is configured to select the first pathway by performing operations comprising: supplying distributed power source power to the appliance; charging the storage cell with power that remains after subtracting power consumed by the appliance from the power generated by the distributed power source; when there is no excess power, supplying the appliance with power stored in the storage cell together with the power generated by the distributed power source; and supplying the power from the commercial electrical grid to cover a power shortage that remains after subtracting the power generated by the distributed power source and the power supplied by the storage cell from the power consumed by the appliance;

the controller is configured to select the second pathway by performing operations in which:

a first excess power selling mode causes the excess power to reversely flow into the commercial electrical grid, and a second assist mode causes all power generated by the distributed power source to flow into the commercial electrical grid, and the storage cell supplies all power to the appliance.

12. The power supply system according to claim 11, wherein the controller prohibits power from the storage cell from being supplied to the appliance before a power cut in the commercial electrical grid, charges the storage cell to a predetermined power storage amount by using the commercial power in a time slot in which an electric power rate of the commercial electrical grid is lower before the power cut in the commercial electrical grid, and selects the first pathway during the power cut.

13. The power supply system according to claim 12, wherein the controller selects the first pathway when a power supply capacity of the commercial electrical grid satisfies a power demand, and selects the second pathway when the power supply capacity falls short of the power demand.

14. The power supply system according to claim 13, wherein the controller switches to the second assist mode when the power supply capacity is estimated to fall short of the power demand within an execution period of the second pathway.

15. The power supply system according to claim 11, wherein the controller selects the first pathway when a power supply capacity of the commercial electrical grid satisfies a power demand, and selects the second pathway when the power supply capacity falls short of the power demand.

16. The power supply system according to claim 15, wherein the controller switches to the second assist mode when the power supply capacity is estimated to fall short of the power demand within an execution period of the second pathway.

17. The power supply system according to claim 11, wherein the controller receives data from an electric power company of the power from the commercial electrical grid in advance, the data indicating whether the electric power company will purchase excess power, selects the first pathway when the data indicates that excess power will not be purchased, and selects the second pathway when the data indicates that excess power will be purchased.

18. The power supply system according to claim 17, wherein the controller receives data from the electric power company indicating when the second assist mode will start within an execution period of the second pathway.

19. The power supply system according to claim 17, wherein the controller automatically selects the first pathway when communication with the power company is interrupted or when a power cut occurs in the commercial electrical grid.

20. The power supply system according to claim 17, wherein the data is received from a management server of the electric power company.

* * * * *